United States Patent [19]

Wong

[11] Patent Number: 4,663,567
[45] Date of Patent: May 5, 1987

[54] GENERATION OF STABLE LINEAR PLASMAS

[75] Inventor: Sik-Lam Wong, El Cerrito, Calif.

[73] Assignee: Physics International Company, San Leandro, Calif.

[21] Appl. No.: 792,334

[22] Filed: Oct. 28, 1985

[51] Int. Cl.⁴ .............................................. G21G 4/00
[52] U.S. Cl. .......................... 315/111.21; 315/111.41; 315/111.71; 378/119; 378/120; 376/125
[58] Field of Search ............ 315/111.21, 111.41, 315/111.71; 378/119, 120; 372/5, 55, 58, 76; 376/125

[56] References Cited

U.S. PATENT DOCUMENTS

| | | | |
|---|---|---|---|
| 3,214,342 | 10/1965 | Linhart | 376/125 |
| 4,494,043 | 1/1985 | Stallings et al. | 315/111.41 |
| 4,589,123 | 5/1986 | Pearlman | 376/144 |

*Primary Examiner*—Harold Dixon
*Attorney, Agent, or Firm*—Robert R. Tipton

[57] ABSTRACT

An ionizable material is injected in the shape of concentric jet and cylindrical column of gases from a cathode-nozzle toward an anode and subjected to a very short, high voltage pulse of electrical current having sufficient magnitude to create a high magnetic field which implodes the cylindrical column of ionizable material and compresses the central jet of ionizable material to a very dense plasma that is relatively stable longitudinally that can be used as a gain medium for a long wave length X-ray laser.

5 Claims, 6 Drawing Figures

GENERATION OF STABLE LINEAR PLASMAS

BACKGROUND OF THE PRIOR ART

This invention relates generally to imploding plasma devices and in particular to methods and apparatus for imploding a plasma to achieve a longitudinally stable, consistent and reliable source of low frequency X-rays.

Imploding plasma devices are well known in which a stream or column of ionizable material is subjected to a sudden pulse of high voltage current causing it to ionize and collapse or implode to create a very high density plasma capable of emitting long wave length X-rays.

Such devices, however, although producing X-rays, give rise to plasmas which are unstable to the sausage and kink instabilities. These instabilities would cause the plasma to "sausage" or form into individual plasma segments and to "kink" or become irregularly shaped or curved along its longitudinal axis.

For the purpose of X-ray amplification by stimulated emission of radiation within a plasma, it is essential that the plasma be generally homogeneous or uniform and linearly or longitudinally stable.

The devices of the prior art were all designed to generate either a single jet of ionizable material which was then imploded or a single cylindrical column of ionizable material which was then imploded or compressed. In all the devices of the prior art, plasma instabilities were the primary problems that prevented lengthy containment of the plasma and forming or holding the plasma to a particular shape.

SUMMARY OF THE INVENTION

To overcome these prior art difficulties and create a consistently reliable, uniform and longitudinally stable plasma so that X-ray amplification by stimulated emission of radiation within a plasma may be possible, the device of the present invention comprises, basically, concurrently creating first hollow and second solid coaxial cylinders of gas and then applying a high voltage, high current pulse along the common axis of the hollow and solid gaseous cylinders to cause them to implode on axis to generate a hot, dense and longitudinally stable plasma such that the plasma can act as a lasing medium for an X-ray laser in which internally generated X-rays stimulate further emission of X-rays within the plasma along its longitudinal axis whereby coherent X-ray radiation can be produced.

The ionizable gas, prior to imploding or pinching the hollow gaseous cylinder, could be heated by other means such as collision pumping, photo-excitation, recombinant schemes or the like.

The apparatus for creating the plasma comprises, basically, an anode, a cathode-nozzle spaced apart from the anode, the cathode-nozzle comprising a first nozzle adapted to inject a jet or cylinder of ionizable material into the gap or space between the anode and cathode-nozzle and a second nozzle coaxial with the first nozzle and adapted to inject a cylinder of ionizable material concentric about the jet or solid cylinder of ionizable material and a means for generating a high voltage, high current pulse between the anode and cathode-nozzle whereby the concentric columns of ionizable material are caused to implode and generate an energetic, generally uniform and longitudinally stable plasma for generation of X-rays.

It is, therefore, an object of the present invention to provide an apparatus for imploding plasmas of repeatable density and emission of radiation.

It is a further object of the present invention to provide an imploding plasma device for producing a generally uniform and longitudinally stable plasma for generation of X-rays.

It is another object of the present invention to provide a plasma generating apparatus for producing a generally uniform and longitudinally stable plasma which can be used as a lasing medium in which X-ray amplification by stimulated emission of radiation within a plasma is possible.

It is yet another object of the present invention to provide an imploding plasma device in which the ionizable material defines concentric cylinders of ionizable material.

It is a further object of the present invention to provide an imploding plasma device utilizing a cathode nozzle to provide supersonic flow of concentric cylinders of an ionizable material with sufficient control to provide stable compressions.

These and other objects of the present invention will become manifest upon study of the following detailed description when taken together with the drawings.

DESCRIPTION OF THE PREFERRED EMBODIMENT

Figure 2:
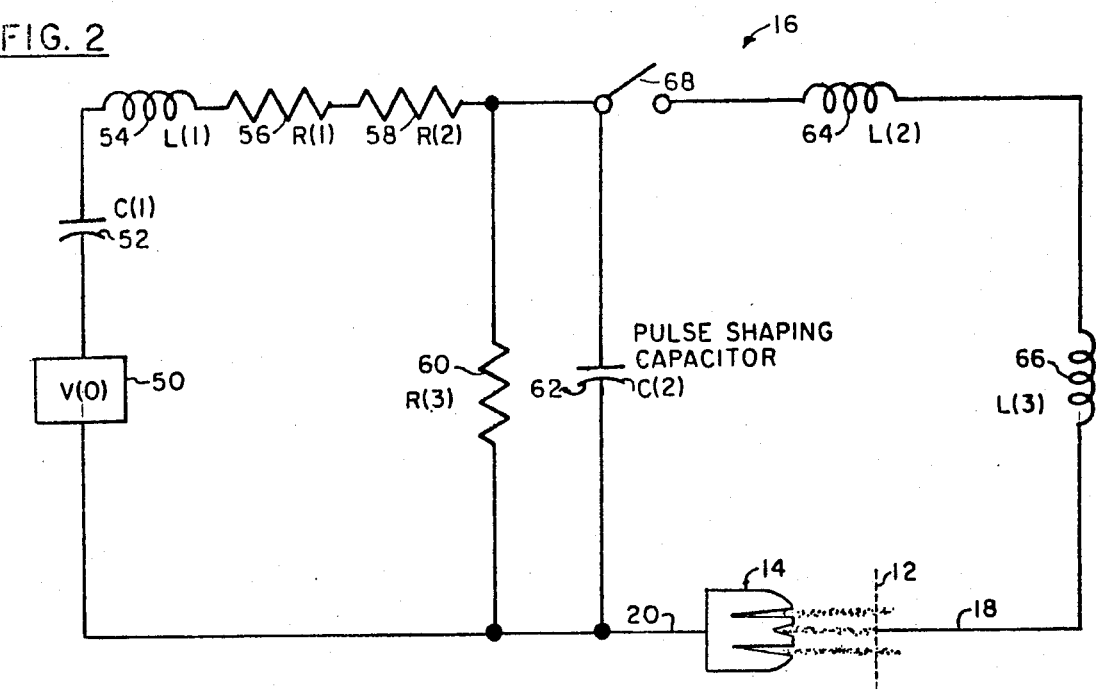
FIG. 2 is a schematic electrical circuit diagram of the apparatus of FIG. 1 showing some of the basic capacitances, inductances and resistances in the circuit and their method of connection.

In the prior art devices, such as the device and method of generating a plasma disclosed in U.S. Pat. No. 4,494,043, a single jet or cylinder of ionizable material was injected between a cathode and an anode and subjected to a high voltage, high current pulse causing it to implode and emit X-rays due to collisions of the energetic particles.

It is well known that such Z-pinch plasmas are extremely unstable both in in shape and density. As a result, they tend to not be uniform in electron and energy density. They are also unstable in linear shape and tend to twist or "kink".

The coaxial Z-pinch is subject to all the magnetohydrodynamic (MHD) instabilities. The most dominant of these instabilities are the "sausage" instability whereby the pinched plasma becomes a string of beads or segments and the "kink" instability by which the pinched plasma is twisted or otherwise becomes crooked.

The coaxial Z-pinch has been studied with respect to the generation of soft X-rays, however, the reasons for the instabilities of such a pinched plasmas is presently not well known.

Although it is possible to heat one plasma with another plasma, no theory or prior art has indicated that the combining of two unstable plasmas would create a stable plasma.

During experiments which were intended to determine methods to improve the X-ray performance of unstable Z-pinch plasmas, it was found that doppler broadening of the spectral lines occurred during compression of the plasma. This tended to reduce the gain of the plasma as a lasing medium.

In particular, while the single jet annular nozzle created plasmas in the required electron temperature and density range (600–1,000 eV and $10^{20}$–$10^{21}$ cm$^{-3}$), the high run-in velocities during compression of the plasma produced directed-motion doppler broadening of the X-ray lines that degraded the gain of the plasma. This phenomenon is unrelated to plasma instability.

In order to overcome the doppler broadening problem, it was conceived to provide a central jet of ionizable material concentric or coaxial within the cylindrical column of ionizable material whereby the central coaxial jet of ionizable material would be heated adiabatically by the collapsing or pinched cylindrical column of ionized material.

In this configuration, the high current pulse through the outer concentric cylinder would cause it to become highly energetic, implode against the coaxial gas jet and heat the jet by well know heat transfer mechanisms. The temperature rise of the jet would be determined by the mass ratios of the outer cylindrical column and the coaxial gas jets.

Quite unexpectedly, it was discovered that such a coaxial cylinder and jet configuration created a generally longitudinally stable energetic plasma which was generally homogeneous along its longitudinal axis making it suitable as an X-ray lasing medium whereby X-ray radiation generated within the plasma could now tranverse the length of the plasma column to further excite the ionizable material and cause X-ray amplification by stimulated emission of radiation within the plasma.

At present, the exact mechanisms causing this stabilizing effect are not fully understood.

In the present invention, the two-jet coaxial nozzle allows an inner stream of krypton (sometimes with phosphine tracer gas) to be compressed and heated by an outer stream of argon, krypton or neon "pusher" gas. Although applicant has used krypton, argon and neon, other ionizable elements or combinations of elements can be used to create the plasma and the specific identification of particular gasses or elements stated herein is not intended to limit the scope of this application.

For the coaxial nozzle geometry, it was found that the stability and longitudinal linearity of the krypton plasma was significantly improved. Also, a higher degree of population inversion has been observed by applicant in actual experiments.

Figure 1:
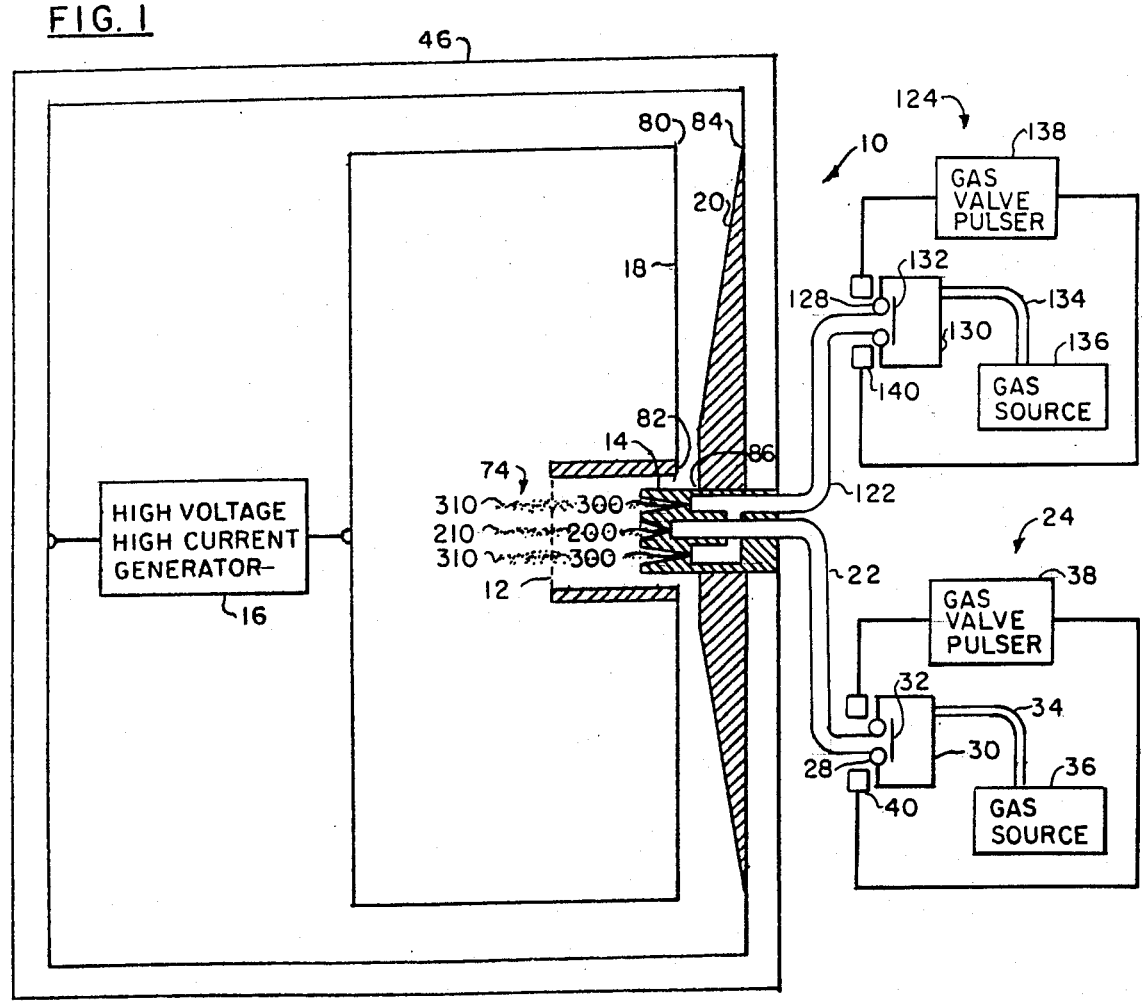
FIG. 1 is a schematic diagram showing the basic configuration of the cathode-anode feed conductor arrangement and gas valve combination of the present invention.

With reference to FIG. 1, the imploding plasma device 10 for generating the coaxial ionizable configuration of the present invention comprises, basically, a foraminous anode 12 spaced apart from a cathode-nozzle 14, which anode 12 and cathode 14 are electrically connected, respectively, to high voltage, high current generator 16 through anode feed conductor 18 and cathode feed conductor 20.

First gas pulse shaper apparatus 24 comprises, basically, first gas valve 30 in fluid communication with first central jet orifice 200 of cathode-nozzle 14 and having a first aluminum valve member 32 disposed over the end of first conduit 22 defining a first valve seat 28 with a conduit 34 connecting first gas valve 30 to first gas source 36.

First gas pulser 38 is connected to first magnetic coil or solenoid 40 juxtaposed adjacent first valve member 32 so that first aluminum valve member 32 comes within the magnetic field created by first magnetic coil or solenoid 40.

Second gas pulse shaper apparatus 124 comprises, basically, second gas valve 130 in fluid communication with concentric cylindrical jet nozzle 300 of cathode-nozzle 14 and having a second aluminum valve member 132 disposed over the end of second conduit 122 defining a second valve seat 128 with a conduit 134 connecting second gas valve 130 to second gas source 136.

Second gas pulser 138 is connected to second magnetic coil or solenoid 140 juxtaposed adjacent second valve member 132 so that second aluminum valve member 132 comes within the magnetic field created by second magnetic coil or solenoid 140.

A vacuum-tight housing 46 is provided around the cathode-anode configuration and their conductors.

With reference to FIG. 2 there is illustrated a schematic electrical diagram of the high voltage, high current generator 16 and cathode 14, anode 12, cathode feed conductor 20 and anode feed conductor 18 configuration of FIG. 1.

Typically, high voltage, high current generator 16 would comprise a Marx generator, well known in the art, in which voltage source V(0) 50 is supplied as an initial charge to the circuit comprising Marx generator capacitor C(1) 52, first inductance L(1) 54, in series with first resistance R(1) 56, the above being the internal capacitances, resistances and inductances of the Marx generator.

A pulse-shaping capacitor C(2) 62 is connected across the output of the Marx generator circuit previously described, though a series resistance R(2) 58. This capacitor has an internal resistance R(3) 60.

A second inductance L(2) 64 representing the inductance of feed conductors 18 and 20 is connected in series with anode 12 and cathode-nozzle 14, which have an internal inductance L(3) 66.

A switch 68 connects the Marx generator portion of the circuit to the anode 12-cathode 14 and anode feed conductor 18-cathode feed conductor 20 configuration.

The operation of the simplified version of the plasma imploding device 10 of the present invention illustrated in FIGS. 1 and 2 is as follows:

Housing 12 is evacuated to a high vacuum, generally to a pressure of a few times $10^{-4}$ torr. An ionizable material, such as krypton, neon or other gaseous or powdered ionizable material is allowed to concurrently flow from first and second gas sources 36 and 136, respectively, through first and second conduits 34 and 134, respectively into first and second gas valves 30 and 130, respectively.

First and second gas pulsers 38 and 138, respectively, are simultaneously actuated to concurrently energize first and second magnetic coils or solenoids 40 and 140, respectively.

The magnetic fields in each of the the coils causes eddy currents to flow in first and second aluminum valve members 32 and 132 sufficient to cause first and second valve members to be repelled away from first and second valve seats 28 and 128, allowing a brief, 100–1,500 microsecond puff of gas to flow down conduits 22 and 122, respectively through central jet orifice 200 and concentric cylindrical jet orifice 300 in nozzle 14 and out towards foraminous anode 12 defining coaxial jet column 74.

The coaxial jet column 74 comprises central jet column 210 surrounded coaxially by outer cylindrical jet 310.

Concurrently with the injection of gas through foraminous anode 12, switch 68 of high voltage, high current generator 16 is closed causing a high voltage, high current pulse to be conducted toward cathode 14 through cathode feed conductor 20, through cathode-nozzle 14 and back through anode 12 and anode feed conductor 18.

Upon closure of switch 68, the high voltage, high electron current pulse will travel down cathode feed conductor 20 causing an electrical current to flow through coaxial cylindrical and jet column of ionizable material 74.

Such a high current pulse will cause rapid implosion of outer concentric cylindrical column 300 and compress central jet column 200 thereby producing a very high density, high temperature column of plasma capable of generating low frequency X-rays and having a longitudinal stability and homogeneous density to permit the generated X-rays to pass longitudinally through the plasma column to cause, under gain conditions, X-ray amplification by stimulated emission of radiation within a plasma.

Because of the accurate control of the impedance of the feed conductors to the anode-cathode configuration, along with the ability of first and second gas valve pulsers 38 and 138, respectively, to shape the coaxial gas pulses being emitted from cathode-nozzle 14, consistent and reliable implosion results can be achieved.

Figure 3:
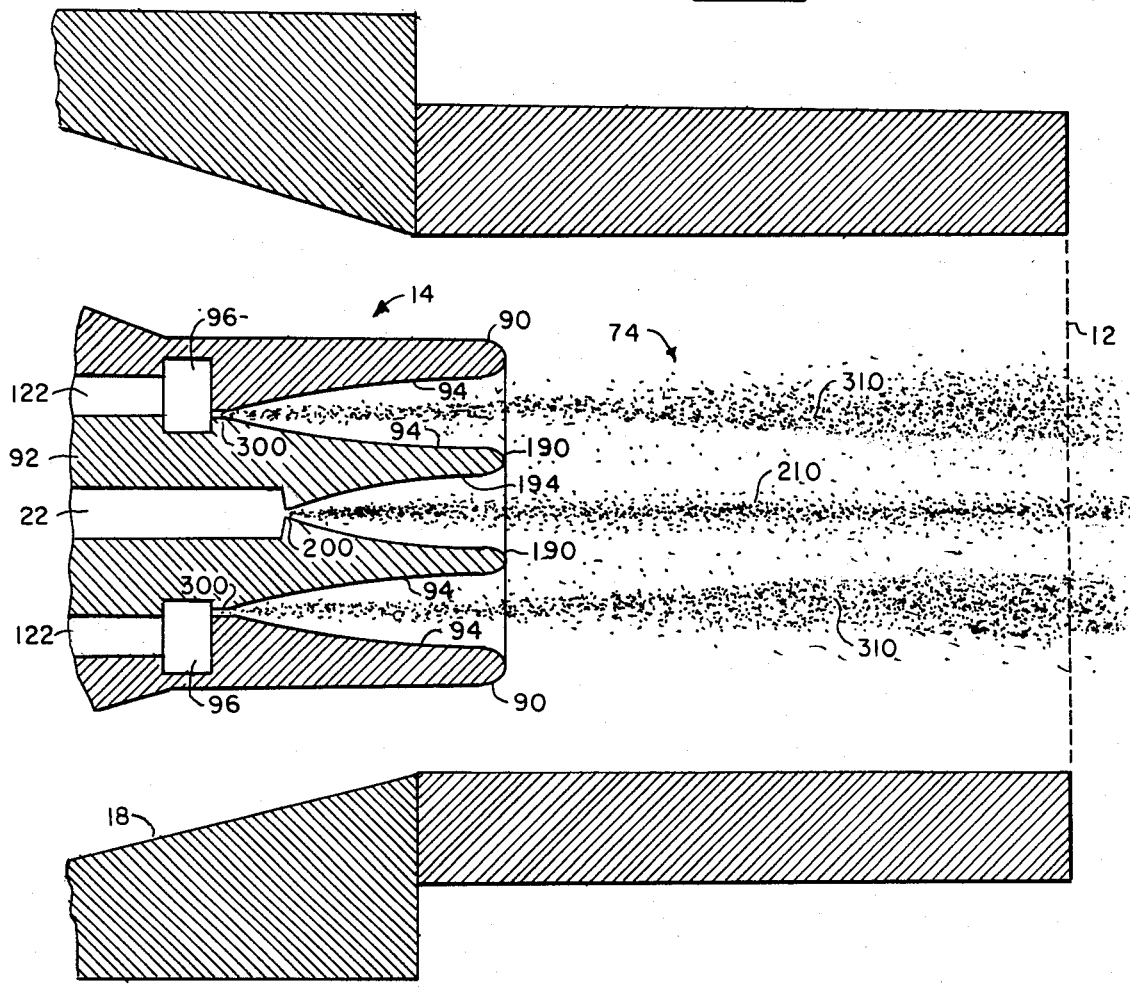
FIG. 3 is a cross-sectional, elevational view of a typical cathode-nozzle and anode configuration showing the flow densities of the ionizable material into the space between the anode and cathode at the moment of application of the high voltage, high current pulse.

With reference to FIG. 3, there is illustrated a typical supersonic cathode-nozzle 14 and foraminous anode 12 configuration showing the typical shape of ionizable material flowing between anode 12 and cathode 14.

With respect to the apparatus for generating outer cylindrical gas jet 310, cathode-nozzle 14 comprises an outer peripheral lip 90 defining a generally cylindrical member spaced apart and concentric about central or inner concentric cylindrical jet nozzle member 92 to thereby define a generally tapered throat 94 terminating in cylindrical orifice 300.

A gas stilling chamber 96 is provided at the base of central cylindrical jet nozzle member 92 for the gas being provided to outer cylindrical gas jet 310 through orifice 300. Stilling chamber 96 receives gas from second gas feed conduit 122.

The ionizable gas entering from second feed conduit 122 into stilling chamber 96 then passes through orifice 300 into annular tapered throat 94 to be ejected at very high velocity into the space between cathode-nozzle 14 and foraminous anode 12 to form cylindrical gas jet 310.

With respect to the apparatus for generating inner coaxial gas jet 210, cathode-nozzle 14 further comprises an inner concentric nozzle 92 comprising an outer lip 190 defining a generally cylindrical member spaced apart from peripheral lip 90, whose outer surface defines the inner surface of generally tapered throat 94 of the nozzle used to generate outer cylindrical jet 310.

Conduit 22 is adapted to be in fluid communication with orifice 200 in inner concentric jet nozzle member 92 and conducts gas to form inner coaxial gas jet 210 through orifice 200.

The ionizable gas entering from first feed conduit 22 then passes through orifice 200 into annular tapered throat 194 to be ejected at very high velocity into the space between cathode-nozzle 14 and foraminous anode 12 to form coaxial gas jet 210.

Ionizable material column 74 is shown as a dotted cloud with the cross-sectional density illustrated by a darkening or closer spacing of the particles of ionizable material.

It can be seen that the ejected ionizable material will define a cylindrical shell surrounding a central generally cylindrical jet immediately upon leaving cathode-nozzle 14 and, when subjected to the high current pulse from high voltage, high current generator 16, it will be caused to pinch or be compressed into a high density, longitudinally homogeneous and stable plasma and thereby emit soft X-rays which can pass longitudinally though the plasma to cause X-ray amplification by stimulated emission of radiation within the plasma.

Figure 4:
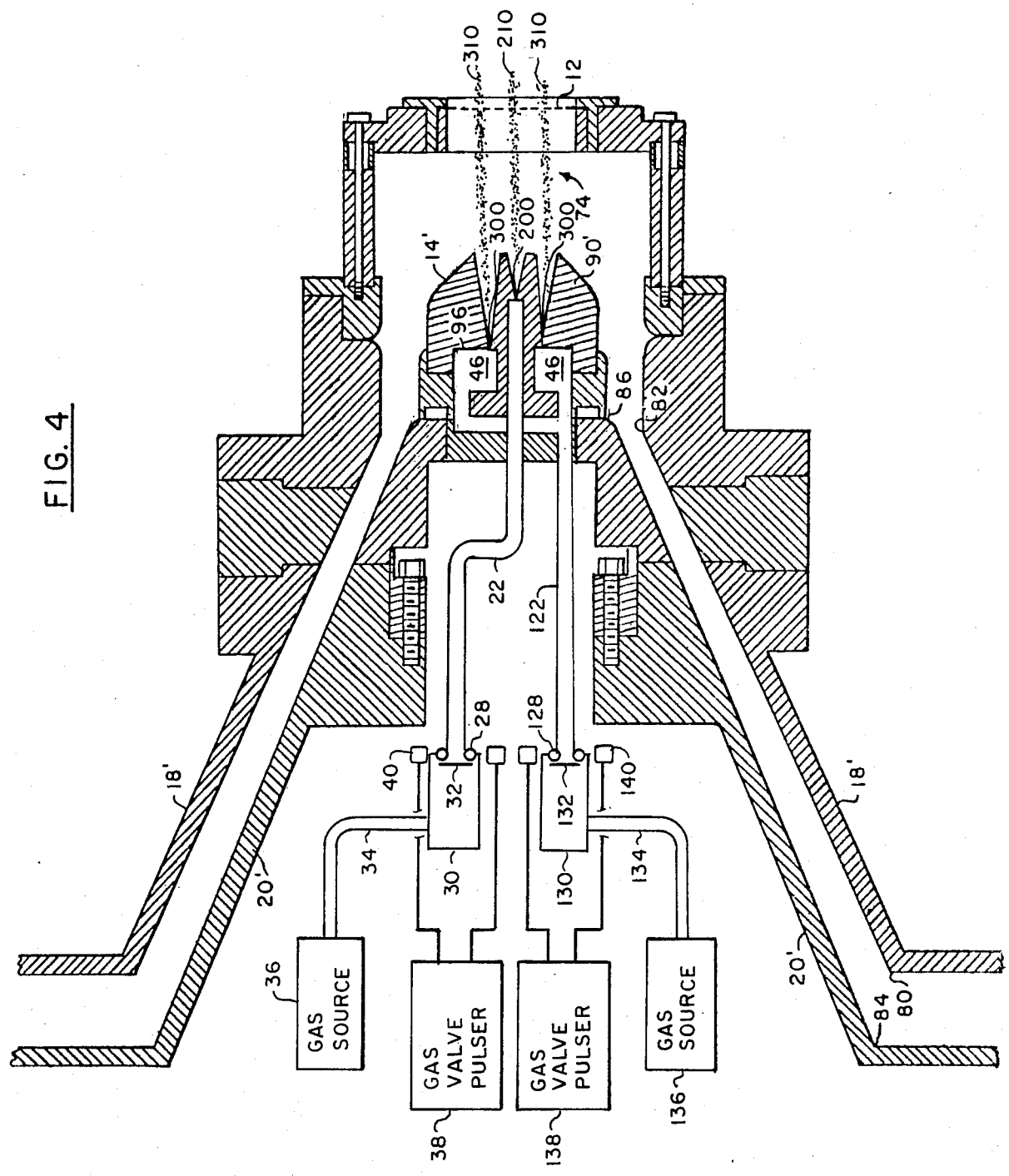
FIG. 4 is a cross-sectional, elevational view of an actual device used for imploding a cylindrical column of ionizable material.

With reference to FIG. 4, there is illustrated a cross-sectional, elevational view of an actual apparatus particular elements of the apparatus of FIG. 4 are described in detail, certain of the elements may be constructed of other materials and be of other designs, however, the functions they perform will generally remain the same for similar apparatus.

The apparatus of FIG. 4 comprises, basically, the same elements as identified in FIG. 1, however, anode feed conductor 18' and cathode feed conductor 20', instead of being perpendicular to the direction of ejection of ionizable material, are adapted to be conical in shape.

To operate the imploding plasma device as shown in FIG. 4, first and second gas valve pulsers 38 and 138 are caused to generate a current and energize first and second magnetic coils or solenoids 40 and 140, respectively, to create a magnetic field to cause eddy currents to flow in first and second aluminum valve members 32 and 132.

As eddy currents are formed in aluminum valve members 32 and 132, first and second valve members 32 and 132 will be repelled by the magnetic field generated in first and second magnetic coils 40 and 140 away from first and second valve seats 28 and 128.

This action will cause gas to flow from first and second gas sources 36 and 136 through first and second conduits 34 and 134 into first and second valves 30 and 130 and then out between first and second aluminum valve members 32 and 132 and first and second valve seats 28 and 128.

The gas then flows into first and second gas feed conduits 22 and 122.

The gas then flows out through inner and outer orifices 200 and 300, respectively, into inner and outer nozzle throats 194 and 94, respectively, and finally out into the space between cathode 14' and foraminous anode 12'.

While the gas still defines a concentric or coaxial jet and cylindrical column configuration, a high voltage, high current pulse is applied by high voltage, high current generator 16 to anode feed conductors 18' and cathode feed conductor 20'.

Thus, a high flow of current will be caused to pass through coaxial cylindrical column 74 of ionizable material thereby creating a high pinch effect to condense and pinch the ionized material in outer cylindrical column 300 and inner jet 200 into a high density, homogeneous, longitudinally stable plasma to generate soft X-rays and allow, under gain conditions, X-ray amplification by stimulated emission of radiation within a plasma to occur.

Figure 5:
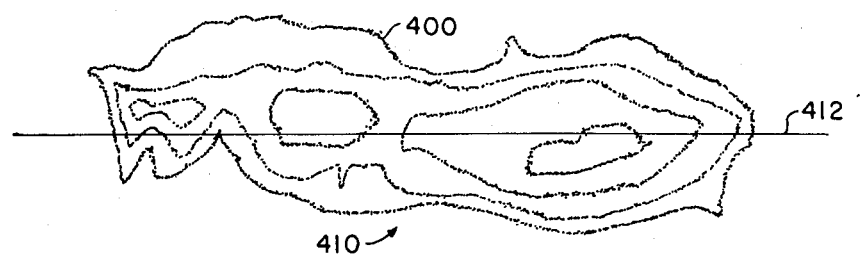
FIG. 5 is a plot of isodensity lines for radiation from a single cylindrically shaped column of plasma at maximum compression.

With reference to FIG. 5, there is illustrated a plot of isodensity lines 400 for radiation from a single cylindrically shaped column 410 of plasma at maximum compression.

This plot was estimated from an actual pinhole photograph of a single cylindrical column of plasma at maximum compression. The isodensity lines 400 refer to the neutral density on the photographic film. The neutral density on the film would translate into intensity of radiation of the plasma. The areas of highest radiation intensity are near the middle portion of the plasma cloud while the area of lowest radiation intensity is at the outer edge of the plasma cloud.

It will be noted in FIG. 5 that the inner portion of the plasma cloud 410 varies in uniformity of radiation intensity and that the areas are not situated along a straight line.

Figure 6:
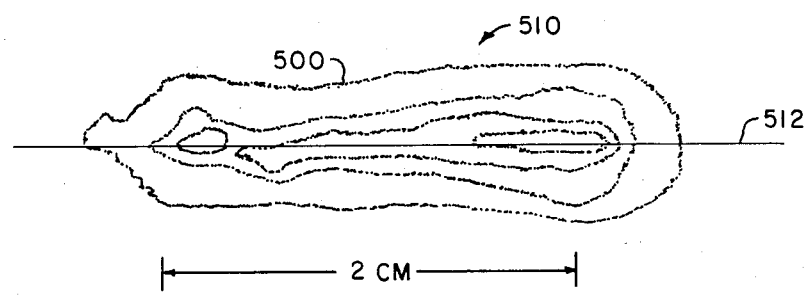
FIG. 6 is a plot of isodensity lines for radiation from a concentric cylinder and jet or column of plasma at maximum compression.

With reference to FIG. 6, there is illustrated a plot of isodensity lines 500 for a concentric cylinder and jet or column of plasma 510 at maximum compression.

This plot was computer generated from a measurements of photographic film neutral density from an actual pinhole photograph taken for the coaxial cylindrical column and jet configuration of the present invention at maximum compression.

As in FIG. 5, the neutral density of the film would translate into intensity of radiation of the plasma cloud 510.

The areas of highest plasma radiation intensity are near the middle portion of the plasma cloud 510 while the area of lowest radiation intensity is at the outer edge of plasma cloud 510.

It will be noted in FIG. 6 that the inner portion of the plasma cloud is much more uniform and homogeneous along the straight line longitudinal axis 512 of the plasma cloud.

Such a configuration will allow the plasma of the present invention to produce X-ray amplification by stimulated emission of radiation within the plasma.

I claim:

1. A method of generating a stable linear plasma comprising the steps of
   creating a first hollow cylindrical column of ionizable material selected from the group consisting of krypton, neon and argon,
   concurrently creating a second cylindrical column of ionizable material, selected from the group consisting of krypton, neon and argon, coaxial with said first hollow cylindrical column of ionizable material and having an outside diameter less than the inside diameter of said first hollow cylindrical column of ionizable material,
   passing an electrical current longitudinally through said first column of ionizable material sufficient to cause said first hollow cylindrical column of ionizable material to be ionized and implode upon said second cylindrical column of ionizable material heating said ionizable material in said second cylindrical column to an ionizable temperature.

2. A method of generating a stable linear plasma comprising the steps of
   concurrently creating first hollow and second solid coaxial cylindrical columns of an ionizable gas
   ionizing said first hollow cylindrical column gas into an outer cylindrical column of plasma by heating said ionizable gas by photo-excitation,
   imploding said ionized first hollow cylindrical column of plasma into said second solid coaxial cylindrical column of ionizable gas to ionize said second cylindrical column of ionizable gas.

3. Apparatus for creating a longitudinally stable plasma comprising
   an anode,
   a cathode-nozzle spaced apart from said anode, said cathode-nozzle comprising
   means for injecting an inner cylindrical column of ionizable material in said space between said anode and said cathode-nozzle,
   means, coaxial with said means for injecting an inner cylindrical column of ionizable material, for injecting a hollow cylindrical column of ionizable material concentric about said inner cylindrical jet of ionizable material, and
   means for generating a high voltage, high current pulse of electrical energy between said anode and said cathode-nozzle and through said cylindrical columns of ionizable material sufficient to ionize said material and to cause said outer hollow cylinder of ionizable gas to implode upon said inner cylindrical jet of ionizable gas.

4. The apparatus as claimed in claim 3 further comprising means for heating said inner and outer cylindrical columns of ionizable material prior to applying said high voltage, high current pulse of electrical energy through said cylindrical columns of ionizable material.

5. Apparatus for creating a longitudinally stable plasma comprising
   an anode,
   a cathode-nozzle spaced apart from said anode, said cathode-nozzle comprising
   an inner nozzle adapted to inject an inner cylindrical column of ionizable material in said space between said anode and said cathode-nozzle,
   and outer nozzle coaxial with said inner nozzle and adapted to inject a hollow cylindrical column of ionizable material concentric about said inner cylindrical jet of ionizable material, and
   means for generating a high voltage, high current pulse of electrical energy between said anode and said cathode-nozzle and through said cylindrical columns of ionizable gas sufficient to ionize said gasses and to cause said outer hollow cylinder of ionizable gas to implode upon said inner cylindrical jet of ionizable gas.

* * * * *